March 7, 1961 M. H. GREENBLATT ET AL 2,974,231
MEASURING APPARATUS
Filed April 2, 1958 2 Sheets-Sheet 1
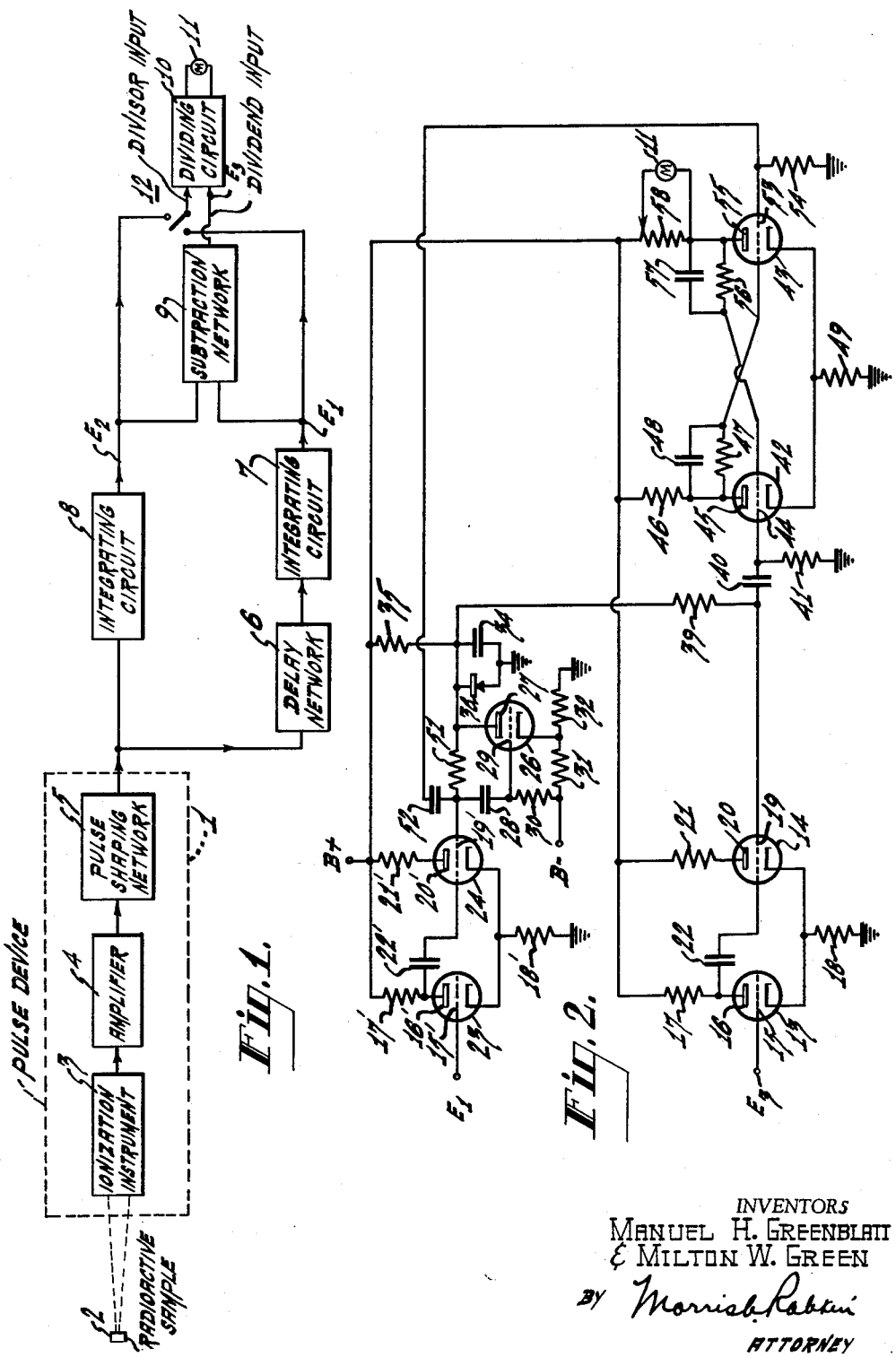
INVENTORS
MANUEL H. GREENBLATT
& MILTON W. GREEN
BY Morrish Rabkin
ATTORNEY March 7, 1961 M. H. GREENBLATT ET AL 2,974,231
MEASURING APPARATUS
Filed April 2, 1958 2 Sheets-Sheet 2

INVENTORS
MANUEL H. GREENBLATT
& MILTON W. GREEN
BY Morris Liskin
ATTORNEY

2,974,231

MEASURING APPARATUS

Manuel H. Greenblatt and Milton W. Green, Princeton, N.J., assignors to Radio Corporation of America, a corporation of Delaware Filed Apr. 2, 1958, Ser. No. 725,859

8 Claims. (Cl. 250—83.3)

This invention relates to measuring apparatus, and more particularly to apparatus for measuring certain properties of radioactive materials.

A radioactive material may be characterized by a specific property known as the decay constant. Related to the decay constant is another important and specific property known as the half life. A knowledge of either of these properties may be useful, for example, as a means of identifying an unknown radioactive material. Most devices presently employed for determining these properties do not yield direct and continuous results.

Accordingly, an object of the present invention is to provide an apparatus for determining either the decay constant or the related half life, or both, of a radioactive material.

Another object of the present invention is to provide a measuring apparatus which yields a direct and continuous indication of either the decay constant or the related half life, or both, of a radioactive material being tested.

Still another object of the present invention is to provide a measuring apparatus which yields a visual indication of either the decay constant or the related half life, or both, of a radioactive material being tested.

Radioactive materials are constantly undergoing atomic disintegration. The rate of atomic disintegration, or rate of decay, at any given time is proportional to the number of atoms of radioactive material present at that time. This fact may be expressed mathematically as follows:

(1) $$\frac{dN}{dt} = -\lambda N$$

(1a) $$\frac{dN}{N} = -\lambda dt$$

where N is the number of atoms of radioactive material present at a time $t$, $$\frac{dN}{dt}$$

is the rate of decay at that time, and $\lambda$ is a constant known as the decay constant of the material. When the above Formula 1a is integrated, the following relationships are obtained:

(2) $$\text{Log}_e \frac{N}{N_0} = -\lambda t$$

(2a) $$N = N_0 e^{-\lambda t}$$

where $N_0$ represents the number of atoms of material present at time $t=0$, and N is the number of atoms of the radioactive material remaining at a later time $t$ measured from $t=0$. N is thus a function of the number of atoms of material present at $t=0$, the decay constant, and the elapsed time $t$. First and second derivatives of Equation 2a yield the following:

(3) $$\frac{dN}{dt} = -\lambda N_0 e^{-\lambda t} = -\lambda N$$

(4) $$\frac{d}{dt}\left(\frac{dN}{dt}\right) = \lambda^2 N_0 e^{-\lambda t} = -\lambda \frac{dN}{dt} = \lambda^2 N$$

Equation 4 is an expression for the rate at which the rate of decay is changing at time $t$. It may readily be seen that when Equation 4 is divided by Equation 3, the value $-\lambda$ is obtained as the ratio of the rate of change of the decay rate to the decay rate.

The half life of a radio active material is the time required for the number of atoms present to decrease to half that number. The half life may be determined by substituting $N = \tfrac{1}{2} N_0$ in Equation 2a. The reduced expression is:

$$T = \frac{0.693}{\lambda}$$

where T is the half life of the radioactive material.

In accordance with the present invention, a radiation responsive pulse device provides an output of pulses occurring at a frequency proportional to the rate of decay of the material being tested. These output pulses are delayed for an interval of time $\Delta t$ and a direct current (D.C.) voltage is established which is proportional to the frequency of the delayed pulses. A second D.C. voltage is established which is proportional to the frequency of the undelayed pulse output of the pulse device. If the first voltage is proportional to the rate of decay at time $t_1$, then the simultaneously occurring second voltage is proportional to the rate of decay at time $t_2 = t_1 + \Delta t$. These voltages are proportional, respectively, to $\lambda N_1$ and $\lambda N_2 = \lambda(N_1 - \Delta N)$, where $N_1$ is the number of atoms of material present at time $t_1$, $N_2$ is the number of atoms of material present at time $t_2$, and $\Delta N$ is the number of atoms disintegrating during the time interval $\Delta t$. The second voltage is subtracted from the first (or vice versa) and a difference voltage is obtained which is proportional to $\lambda \Delta N$. The voltages which are proportional, respectively, to $\lambda N_1$ and $\lambda \Delta N$ may be supplied as inputs to a divider circuit and a quotient obtained which is proportional to $$\frac{\Delta N}{N_1}$$

If the delay interval $\Delta t$ is short compared to the half life of the material being tested, the quantity $$\frac{\Delta N}{\Delta t}$$

is a close approximation of $$\frac{dN}{dt}$$

and $$\frac{\Delta N}{N_1}$$

is approximately equal to $\lambda \Delta t$. A meter may be connected to the output of the divider circuit to provide a direct and continuous visual indication of this quotient. Since the delay interval $\Delta t$ is a known quantity which may be held constant during any test, the meter may be calibrated to indicate directly either the decay constant or the half life, or both. It will be recognized that when the delay interval is very short compared to the half life, and the charge in the rate of decay during this interval is correspondingly small, either of the established voltages may be applied to the divider circuit as the divisor voltage.

The foregoing and other objects, the advantages and novel features of this invention, as well as the invention itself both as to its organization and mode of operation, may be best understood from the following description when read in connection with the accompanying drawing, in which like reference numerals refer to like parts, and in which:

Figure 1 is a block diagram illustrating one embodiment of the present invention;

Figure 2 is a schematic diagram of a preferred dividing circuit for use in the apparatus of the present invention.

Figure 3:
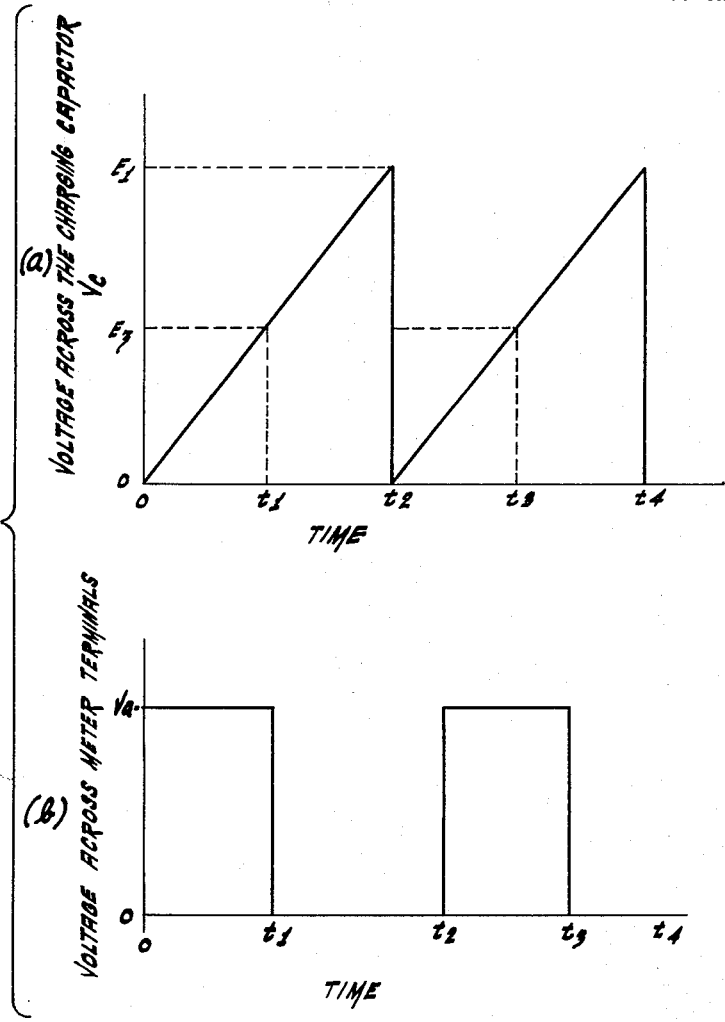
Figure 3 is a graph illustrating the voltage across the charging capacitor shown in Figure 2, and the voltage applied to the terminals of the output meter shown in Figure 2, both plotted to the same time scale.

With reference to Figure 1, a pulse device 1 provides an output of pulses of constant amplitude and duration. These pulses occur at a frequency proportional to the rate of decay of a sample of radio active material 2. The pulse device 1 may include, for example, an ionization instrument 3, such as a Geiger tube, which provides an output of pulses occurring at a frequency proportional to the rate of decay of the sample 2, for amplifying said pulses, and a pulse shaping network 5, which may be, for example, a univibrator. A scaler or count-down arrangement (not shown) for frequency sub-division may also be included if it is desired to step down the pulse frequency. The output of the pulse device 1 is coupled to a delay network 6. The delay network may be a parallel wire delay line or lumped constant, simulated delay line, and may, in either event, have an adjustable delay period. After a delay interval $\Delta t$, the pulses are coupled to an integrating circuit 7 where the pulses are averaged and a substantially direct current (D.C.) voltage $E_1$ established which is proportional to the frequency of the delayed pulses. This voltage $E_1$ is applied to one input terminal of a subtraction network 9 which may be, for example, a simple resistance network.

The output pulses of the pulse device 1 are also coupled directly to a second integrating circuit 8 where the pulses are averaged and a second substantially D.C. (or slowly varying) voltage $E_2$ is established, which voltage is proportional to the frequency of the pulses coupled to the second integrating circuit 4. Each of the integrating circuits 7 and 8 may be a simple resistor-capacitor integrating circuit. The latter voltage $E_2$ is applied to a second input terminal of the subtraction network 9. The output of the subtraction network is a voltage $E_3$ which is the difference between the two applied voltages $E_1$ and $E_2$. This difference voltage $E_3$ is applied to one input terminal of a dividing circuit 10. The second input terminal of the dividing circuit is connected to the selector arm of a switch 12. The output of each integrating circuit 7 and 8 is connected to a different terminal of the switch 12. In one mode of operation of this embodiment of the invention, the switch connects the output voltage $E_1$ of the first integrating circuit 7 to the second input terminal of the dividing circuit 10. In another mode, the output voltage $E_2$ of the second integrating circuit 8 is applied to the dividing circuit. A meter 11 may be connected across the output terminals of the dividing circuit 10 to provide a direct and continuous indication of the quotient. A preferred dividing circuit for use in the present invention is illustrated schematically in Figure 2. The common connections between the blocks of Figure 1 have been omitted.

As an illustration of the opertion of the apparatus hereto described, at time $t_1$ pulses of a frequency proportional to the rate of decay, that is, proportional to $\lambda N_1$, are coupled to the delay network 2. After a delay interval $\Delta t$ these pulses are integrated and a voltage $E_1$ established. This voltage, proportional to $\lambda N_1$, is applied to one input terminal of the subtraction network 9. Applied simultaneously to another input terminal of the subtraction network is a voltage $E_2$ proportional to the frequency of the pulses occurring at a later time $t_2 = t_1 + \Delta t$. This latter voltage is proportional to $\lambda N_2$. The output of the subtraction network 9 is a voltage $E_3$ equal to the difference between the input voltages, or $E_1 - E_2$. Since $N_2$ is equal to $N_1 - \Delta N$, the difference voltage is proportional to $\lambda \Delta N$. In one mode of operation of the embodiment described, voltages $E_3$ and $E_1$ are applied to different input terminals of the dividing circuit 10 and a quotient obtained which is proportional to $$\frac{\Delta N}{N_1}$$

For reasons hereinbefore explained, the voltage $E_2$ may be applied to the dividing circuit instead of $E_1$. In either case, the output of the dividing circuit is a close approximation of $\lambda \Delta t$. Since the time delay may be held constant during any test, an output meter may be calibrated to read directly either the decay constant or the half life, or both. By checking one reading with the switch in one position against another with the switch in the other position, some idea of the accuracy of the readings may be obtained.

A preferred form of dividing circuit for use in the apparatus of the present invention is illustrated in Figure 2. The divider circuit includes two comparison stages, a voltage charging circuit, a capacitor discharge circuit, and a bistable flip-flop stage. The first comparison stage includes a pair of tubes 13 and 14, only one of which is conducting at any time. The dividend voltage $E_3$, which is positive, is applied to the control grid 15 of the first tube 13. The anode 16 of this tube 13 is connected through a resistor 17 to a source of high voltage, designated B+. A coupling capacitor 22 is connected between this anode and the control grid 19 of the second tube 14. A resistor 21 is connected between the anode 20 of this second tube 14 and B+. The cathodes of both tubes are connected to one end of a common cathode biasing resistor 18, the other end of which is connected to a point of common reference potential, illustrated as ground. In normal operation the first tube 13 conducts by virtue of the positive voltage $E_3$ applied to its control grid 15. The second tube 14 is thus biased below cutoff by cathode bias until the voltage applied to its control grid 19 reaches and just exceeds the dividend voltage $E_3$, at which time the second tube 14 conducts almost instantaneously. Conduction through the first tube 13 is then reduced to zero almost instantaneously and the voltage at the anode 16 of this tube rises sharply. A positive pulse is coupled through the coupling capacitor 22 to the control grid 19 of the second tube 14.

The second comparison stage includes a pair of tubes 23 and 24. A positive divisor voltage, illustrated as $E_1$, is applied to the control grid 15' of the first tube 23. The operation of this second comparison stage is similar to the operation of the first comparison stage and correspondingly designated components perform similar functions. Hence, a detailed explanation need not be repeated. The second tube 24 is held non-conducting until the voltage applied to its control grid 19' reaches and just exceeds the divisor voltage $E^1$.

The charging circuit includes the series combination of a capacitor 34 and a resistor 35 connected, respectively, between ground and B+. A rectifier element 36 is connected in parallel with the charging capacitor 34. The anode 27 of the discharge tube 26 is connected to the junction of the capacitor 34 and the resistor 35. Also connected to this junction are two isolating resistors 39 and 51. These resistors couple the voltage appearing across the charging capacitor 34 to the grids 19 and 19' of the aforementioned second 14 and 24 tubes of the comparison stage. The charging rate of the charging capacitor 34 is determined by the time constant of the series resistor-capacitor combination 34 and 35. If the value of B+ is large compared to the divisor voltage $E_1$ the capacitor 34 will charge nearly linearly over the range from zero to $E_1$ volts. The discharge tube 26 is normally biased below cutoff by the cathode biasing network consisting of the series resistors 31 and 32 connected between a source of negative voltage, illustrated as B−, and ground. A resistor 30 is connected between the control grid 29 and B—. Input signals are coupled to the control grid 29 through a capacitor 28, which capacitor is connected to the grid 19' of the second tube 24 of the upper comparison stage. When the voltage applied to the grid of this second tube 24 from the charging capacitor 34 is sufficient to drive the tube 24 into conduction, the first tube 23 is driven below cutoff as previously described. A positive pulse is coupled through the coupling capacitor 22' to the grid 19' of the second tube 24. This pulse is also coupled to the control grid 29 of the discharge tube 26 through its input coupling capacitor 28, and is of sufficient amplitude to drive the discharge tube into conduction. When the discharge tube 26 conducts, it provides a low impedance path to discharge the charging capacitor 34. The rectifier 36 prevents oscillations about the level of zero volts when the capacitor discharges.

The bistable flip-flop stage includes a pair of tubes 42 and 43. A bistable flip-flop may be defined as an electronic circuit having two stable states and ordinarily two input terminals (or types of input signals), each of which corresponds with one of the two states. The circuit remains in either state until caused to change to the other state by application of the corresponding signal. One of these signals is applied to the control grid 44 of the first tube 42 through a coupling capacitor 40. A signal is applied to this grid when the first tube 13 of the lower comparison stage is driven below cutoff. Signals are applied to the control grid 53 of the second flip-flop tube 43 through a coupling capacitor 52 when the first tube 23 of the upper comparison stage is driven below cutoff. The anodes 45 and 55 of the first and second flip-flop tubes are each returned to B+ through separate resistors 46 and 58. Likewise, the corresponding control grids 44 and 53 are returned to ground through separate resistors 41 and 54. Both cathodes are returned to ground through a common cathode biasing resistor 49. The anode 45 of the first tube 42 is connected to the control grid 53 of the second tube 43 through the parallel combination of a resistor 47 and a capacitor 48. The anode 55 of the second tube is connected to the control grid 44 of the first tube 42 in a similar manner by a resistor 56 and a capacitor 57. An average reading voltmeter 11 has one terminal connected to the anode of the second tube 43 and the other terminal connected to a variable tap of the anode resistor 58.

The operation of the dividing circuit may best be understood with reference to the graph of Figure 3, wherein Figures 3A and 3B show, respectively, the voltage appearing across the charging capacitor 34 and the voltage applied across the terminals of the meter 11, each plotted to the same time scale. At a time $t=0$ the voltage across the charging capacitor 34 is zero and the first tubes 13 and 23 of the comparison stages are conducting by virtue of the positive voltages $E_3$ and $E_1$ applied to their respective control grids 15 and 15'. The second flip-flop tube 43 is conducting and a voltage $Va$ is applied across the terminals of the meter 11. At a later time $t_1$ the capacitor 34 has charged to a value of voltage equal to the dividend voltage. This voltage applied to the control grid 19 of the second tube 14 of the lower comparison stage, drives this tube into conduction, which conduction cuts off the current flowing through the first tube 13. A positive pulse is coupled through the coupling capacitor 22 to the control grid 19 of the second tube 14 and through the coupling capacitor 40 to the control grid 44 of the first flip-flop tube 42. This last-mentioned pulse changes the flip-flop to its other stable state, and reduces the voltage applied across the terminals of the meter 11 to zero. At time $t_2$ the capacitor has charged to a value of voltage equal to the divisor voltage $E_1$. This voltage is sufficient to drive the second tube 24 of the upper comparison stage into conduction, thereby cutting off conduction through the first tube 23. A positive pulse is coupled from the anode 16' of this first tube to the grid 19' of the second tube 24. This pulse is also coupled to the grid 53 of the second flip-flop tube 43 and to the grid 29 of the discharge tube 26, changing the flip-flop stage to its other stable state and driving the discharge tube 26 into conduction. When the discharge tube conducts, it discharges the charging capacitor 34 and again allows both of the first tubes 13 and 23 of the comparison stages to resume conduction.

The average voltage across the terminals of the average reading voltmeter 11 may be calculated as follows:

$$E_{\text{meter}} = \frac{Va(t_1-0) + 0(t_2-t_1)}{(t_2-0)}$$

The triangle $0, t_1, E_3$ is similar to triangle $0, t_2, E_1$. Applying the geometric relationship of similar triangles, $$(t_1-0):(t_2-0) = E_3:E_1$$

The quantity $$\frac{E_3}{E_1}$$

has been shown to be proportional to $\lambda \Delta t$. The meter reading may be rewritten thusly:

$$E_{\text{meter}} = kVa\lambda = K\lambda$$

where $k$ and $K$ are constants which include the factor $\Delta t$, and $Va$ is a constant determined by the circuit parameters and the adjustment of the meter 11.

Greater flexibility may be added to the apparatus of the present invention by providing a delay network 6 which is variable, and by providing suitable scale ranges for the meter 11 which correspond to the settings of the delay network. It will also be recognized that the meter 11 may be provided with dual scales calibrated to read, respectively, the half life and the decay constant.

The apparatus herein described affords a new and direct means for determining the half life and the decay constant of a radioactive material.

What is claimed is:

1. An apparatus comprising a pulse device having a pulsed output of constant amplitude and changing frequency, a delay network connected to receive the output of said pulse device, a subtraction network connected to subtract the outputs of said pulse device and said delay network, and a dividing network having a dividend input, a divisor input, and a quotient output representing the quotient of the said inputs, said dividend input being connected to receive the output of said subtraction network, and said divisor input being connected to receive an output from one of said delay network and said pulse device.

2. In combination with a body of material undergoing atomic disintegration, and a device providing an output of constant amplitude and duration pulses occurring at a frequency proportional to the rate of said disintegration, an apparatus comprising means for establishing a voltage proportional to the frequency of said output, means for delaying said output and for establishing a voltage proportional to the frequency of said delayed output, means for comparing said established voltages and for producing a difference voltage, a dividing circuit having two inputs, said difference voltage being coupled to one of said inputs, and one of said established voltages being coupled to the other of said inputs.

3. An apparatus for determining the half life and the decay constant of a radioactive material, said apparatus comprising a device having an output of pulses proportional to the rate of decay of said radio active material, delay means connected to receive and to delay said output, a subtraction network connected to receive and subtract the outputs of said pulse device and said delay means, a dividing circuit having a divisor input, a dividend input, and a quotient output representing the quotient of its said inputs, said dividend input being connected to receive the output of said subtraction network, said divisor input being connected to receive the output from one of said delay means and said pulse device, and an indicating means connected to receive the said quotient output.

4. In combination with a sample of radioactive material whose decay constant and half life are desired, an apparatus comprising a device having an output of pulses occurring at a frequency proportional to the rate of decay of said sample, means connected to receive said output pulses and to establish a voltage proportional to the frequency of said pulses, second means connected to receive said pulses, said second means being arranged to delay said pulses and to establish a voltage proportional to the frequency of said delayed pulses, means for comparing said voltages and for obtaining a difference voltage, a dividing circuit having two inputs, said difference voltage being applied to one of said inputs, and one of said established voltages being applied to the other of said inputs.

5. An apparatus comprising a radiation responsive pulse device, a delay network connected to receive the output of said pulse device, a first integrating circuit connected to receive the output of said delay network, a second integrating circuit connected to receive the output of said pulse device, a subtraction network connected to subtract the outputs of said first and second integrating circuits, a dividing circuit having two inputs and an output representative of the quotient of said inputs, one of said inputs being connected to receive the output of said subtraction network, and the other of said inputs being connected to receive the output from one of said integrating circuits.

6. An apparatus for measuring the half life and the decay constant of a radioactive material including a device having an output of pulses whose frequency is proportional to the rate of decay of said material, a delay network connected to receive and delay said output pulses, a first integrating circuit connected to receive the output of said delay network, a second integrating circuit connected to receive the output of said device, a subtraction network connected to subtract the outputs of said first and second integrating circuits, a divider circuit having two inputs, one of said inputs being connected to receive the output of said subtraction network, the other of said inputs being connected to receive the output from one of said integrating circuits, and an indicating means connected to receive the output of said dividing circuit.

7. An apparatus for testing radioactive materials including a radiation responsive pulse source, pulse shaping means connected to receive the output of said pulse source, delay means connected to receive the output of said pulse shaping means, a subtraction network connected to subtract the outputs of said delay means and said pulse shaping means, and a dividing circuit having a dividend input, a divisor input, and a quotient output representing the quotient of its said inputs, said dividend input being connected to receive the output of said subtraction network, said divisor input being connected to receive the output from one of said delay means and said pulse shaping means.

8. Measuring apparatus comprising: a radiation responsive pulse means; a pulse shaping network connected to receive the output of said pulse means; a delay network connected to receive the output of said pulse shaping network; first and second integrating circuits connected to receive, respectively, the outputs of said delay network and said pulse shaping network; a subtraction network connected to subtract the outputs of said integrating circuits; a dividing circuit having a dividend input, a divisor input, and a quotient output representing the quotient of said inputs, said dividend input being connected to receive the output of said subtraction network, said divisor input being connected to receive the output of one of said integrating circuits; and means connected to receive said quotient output and to provide an indication thereof.

References Cited in the file of this patent

UNITED STATES PATENTS

| | | |
|---|---|---|
| 2,750,513 | Robinson et al. | June 12, 1956 |
| 2,776,378 | Youmans | Jan. 1, 1957 |
| 2,831,121 | Zito | Apr. 15, 1958 |